(No Model.)

J. W. BROOKS, Jr.
REEL FOR DRYING FISHING LINES.

No. 336,888. Patented Mar. 2, 1886.

WITNESSES:
Fred. G. Dieterich
Wm. E. Dyre

INVENTOR
J. W. Brooks Jr.
By Johnston Reinohl & Dyre
ATTORNEYS

UNITED STATES PATENT OFFICE.

JONATHAN W. BROOKS, JR., OF CHICAGO, ILLINOIS.

REEL FOR DRYING FISHING-LINES.

SPECIFICATION forming part of Letters Patent No. 336,888, dated March 2, 1886.

Application filed December 14, 1885. Serial No. 185,677. (No model.)

*To all whom it may concern:*

Be it known that I, JONATHAN W. BROOKS, Jr., a citizen of the United States, residing at Chicago, in the county of Cook and State of Illinois, have invented certain new and useful Improvements in Reels for Drying Fishing-Lines; and I do hereby declare the following to be a full, clear, and exact description of the invention, such as will enable others skilled in the art to which it appertains to make and use the same.

This invention relates to means for drying fishing-lines before they are wound upon an ordinary fishing-reel and put away; and it has for its object the construction of a reel made of detachable parts which can be readily carried in a box for containing fishing-tackle, and easily put together when desired.

It is a fact well known to anglers that lines wound upon a fishing-reel wet and put away in a box are subject to rot, and are soon rendered unserviceable; and, furthermore, that considerable difficulty and annoyance are experienced in drying a wet line, as it is liable to become twisted and tangled, and not unfrequently requires cutting to untangle it. By the application of my invention a wet line is wound upon the drying-reel, where, by its exposure to the atmosphere or the rays of the sun, it will soon become perfectly dry, when it may be wound off the drying-reel onto an ordinary fishing-reel.

The invention consists in the constructions hereinafter described, and particularly pointed out in the claims.

Figure 1:
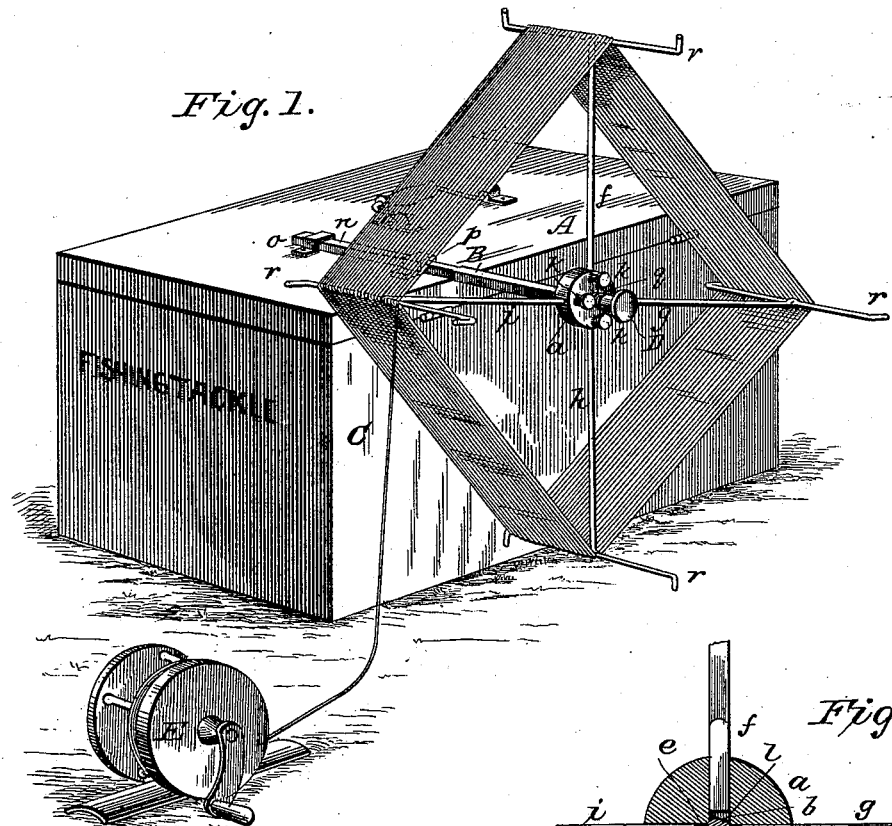
Figure 2:
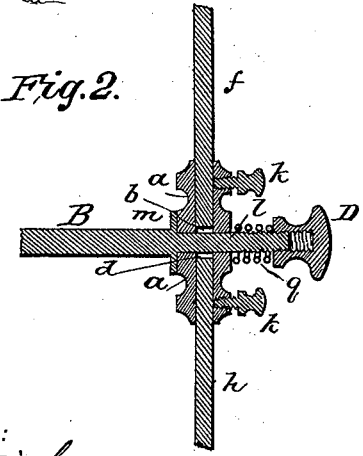
Figure 3:
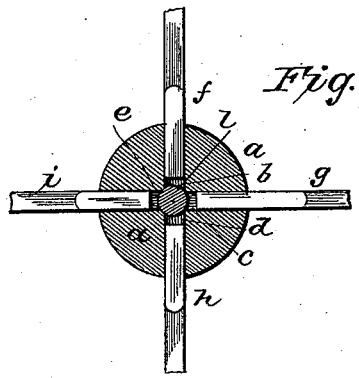

In the accompanying drawings, which form a part of this specification, Figure 1 represents a perspective view of the reel mounted on a fishing tackle box; Fig. 2, a vertical longitudinal section, and Fig. 3 a cross-section through the hub.

Reference being had to the drawings and the letters of reference marked thereon, A designates a reel composed of a hub, $a$, in the form of a disk, and provided with apertures $b\ c\ d\ e$, to receive the inner end of the detachable reel-arms $f\ g\ h\ i$, which are secured in the hub by the screws $k$—one for each arm. The hub is mounted upon a shaft, B, which is provided with a journal, $l$, at one end, and a collar, $m$, against which the inner face of the hub bears. The opposite end of the shaft is squared, as shown at $n$, to enter corresponding seats formed in the straps $o\ p$, which in the present instance are shown secured to the top or lid of a fishing-tackle box, C, by soldering or rivets. The outer end of the shaft B is provided with a nut, D, for adjusting the tension of the spring $g$, which is interposed between the hub and the nut, for a purpose which will be hereinafter referred to. Each of the arms $f\ g\ h\ i$ is provided at its outer end with a cross-bar, $r$, which has its ends turned at a right angle to the plane of the bar to form fingers or sides between which the line is wound.

E represents an ordinary fishing-reel, from which the wet line is unwound upon the drying-reel A, and after having been dried it is again wound upon the reel E, when it may be put into the tackle-box without danger of its rotting.

The operation is as follows: The arms having been inserted in the hub of the reel and secured by the set screws, the reel is placed upon the shaft B and the square end thereof inserted in the straps or seats $o\ p$, attached to the top of the tackle-box. The nut D is run out on the end of the shaft to relieve the hub of the tension of the spring $q$, when the reel may be revolved rapidly to unwind the wet line from the reel E and wind it upon the reel A. After the line has been dried the operation of winding is reversed, the nut D is brought to bear against the spring $q$ to cause the line to wind tightly upon the reel E as it unwinds from reel A.

For convenience the reel A is shown mounted upon a tackle-box, C; but it may be mounted in any other suitable manner, or the shaft B may be held in one hand and the reel turned with the other; and instead of squaring one end of the shaft, as at $n$, it may be flattened, or made of any other irregular form to secure it against revolving, or it may be left round and secured by a set screw.

I am aware that a bobbin for wire grain-binding has had both of its ends turned off, a turned seat provided at one end and a friction plate or disk applied to the opposite end, upon which a tension-spring adjusted by a nut has its bearing, and do not, therefore, claim such a construction.

Having thus fully described my invention, what I claim is—

1. A reel composed of a hub mounted loosely upon a fixed shaft and provided with radial arms, in combination with a tension-spring adapted to bear against the hub and retard the velocity thereof, substantially as described.

2. A reel having a shaft of irregular form at one end and a journal formed on the opposite end, in combination with a hub provided with radial arms, a tension-spring bearing upon said hub, and an adjusting-nut, substantially as described.

3. A reel having a shaft squared at one end and a journal and collar formed on the opposite end, in combination with a hub consisting of a disk having a series of apertures formed in it, and provided with detachable radial arms secured in the hub by set-screws, an adjusting-nut, and a tension-spring interposed between the hub and the nut, substantially as described.

4. A reel consisting of a shaft, a hub, detachable radial arms, screws for securing said arms, a collar formed on the shaft, an adjusting-nut, and a coiled spring interposed between the hub and the nut, all combined substantially as described.

In testimony whereof I affix my signature in presence of two witnesses.

JONATHAN W. BROOKS, Jr.

Witnesses:
F. W. ELDRED,
J. H. BROOKS.